April 7, 1942.  G. E. KING ET AL  2,278,519
VARIABLE VOLTAGE CONTROL SYSTEM
Filed March 30, 1938  2 Sheets-Sheet 1

WITNESSES:
Leon M. Garman
Mw. C. Groome

INVENTORS
George E. King,
William R. Harding &
William F. Eames.
BY Paul E. Friedemann
ATTORNEY Patented Apr. 7, 1942

2,278,519

UNITED STATES PATENT OFFICE 2,278,519

VARIABLE VOLTAGE CONTROL SYSTEM

George E. King, Wilkinsburg, William R. Harding, Pittsburgh, and William F. Eames, Edgewood, Pa., assignors to Westinghouse Electric & Manufacting Company, East Pittsburgh, Pa., a corporation of Pennsylvania Application March 30, 1938, Serial No. 198,884

7 Claims. (Cl. 172—239)

Our invention relates to electric motor control systems, and more particularly to control systems for automatically controlling the operation of motors coupled to drive elements of machine tools as elements of planers, draw-cut shapers, roll grinders, or transfer tables of rolling mills, etc., by a variable-voltage control.

Our invention embodies improvements over the subject matter disclosed and claimed in the application of George E. King, filed March 30, 1938, Serial No. 198,883, now Patent No. 2,221,584, Nov. 12, 1940, and entitled "Control systems" and more particularly expressed relates to a variable voltage control for a reversing motor. In a conventional variable-voltage control, the motor is ordinarily provided with a separately excited field winding, and the desired direction of rotation of the motor is accomplished by reversing the polarity of the electric energy supplied to the motor armature. The motor is arranged to be energized from a generator which may be provided with a series field winding so controlled as to compensate for the IR drop in: the generator armature circuit; the armature circuit of the motor; the series field winding; and the leads interconnecting the generator and motor armatures. The generator is provided with a separately excited main field winding, the current through which is arranged to be controlled and reversed in order to operate the motor and the load attached thereto, for example, a planer platen, at various speeds in either direction of travel. The excitation of the main field winding of the generator may be controlled by means of a rheostat or the combination of various resistors and suitable control devices for inserting various steps of resistance in the circuit of the main field winding. For each position of the controller controlling the field current in the generator, there is a particular speed of operation of the motor and thus the load, as a planer platen, that is desired. Any departure in speed from the desired value introduces undesirable operations of the load. If it were possible to maintain all of the conditions affecting such a control constant, the desired operation could be secured with the simple conventional variable-voltage control just briefly explained.

Since it is manifestly impossible to maintain all the conditions affecting a variable-voltage control constant, we use, with such a control, a regulator-generator having series field windings arranged to be responsive to the current supplied to the motor, and shunt field windings arranged to be responsive to the voltage applied to the motor. These field windings are differentially related to each other and are so disposed with reference to each other that the regulator generator, in operation, generates a voltage which is a function of the speed of, and the load carried by, the motor. Differential field windings are also provided on the regulator-generator and are connected, respectively, in series circuit relation with the main field windings of the generator of the control system for opposing the combined action of the series and shunt field windings. The armature of the regulator generator is arranged to be connected in series circuit relation with these regulator-generator differential field windings and the field windings of the generator of the control system and to the controller, which may be operated to independently vary the flow of current through the main generator field windings.

By a proper selection of the electrical characteristics and constants of the electrical units included with our system of control, and by a selection of a particular interconnection of the electrical units and by making some minor compromises the proper functioning can be secured, that is, the motor speed can be made to be proportional to the setting of controller regardless of: changes in ambient temperature; variations in the load on the motor; direction of operation of the motor; rapidity of the voltage reversal on the motor terminals; and regardless of the many other factors that would ordinarily prevent the desired operation of the motor.

One object of our invention is to provide a constant speed for a tool operating machine regardless of the variations in load on the machine.

A broad object of our invention is to provide a system of control for an electrically operated tool operating machine so as to cause said machine to operate at any selected constant speed for any selected direction of operation regardless of the variation of the variable characteristics of the system of control.

Another broad object of our invention is to provide a system of control for varying the voltage impressed on the terminals of a direct current motor in such manner that the speed selected for the motor by the control is attained in a relatively short time interval and is substantially independent of: the load on the motor; the direction of rotation of the motor; and any of the other factors that would ordinarily prevent operation of the motor at the speed selected for it.

Another object of our invention is to provide for a constant speed of operation of a tool operating machine through electrical means regardless of load variation on the machine which variations range from full load overhauling through zero to full load.

A still further object of our invention is to automatically and invariably secure the same operation of a machine for a given control position of the controller for a machine regardless of any other forces than those set in operation by the controller that might normally influence the operation of the machine.

It is also an object of our invention to provide for any selected constant speed of operation for either direction of operation of a reversing, or reciprocating, machine.

A more specific object of our invention is to provide for so controlling a reversible motor operating a machine tool as a planer platen, a roll table, etc., so as to provide any selected constant speed of operation for the machine for one direction of operation of the motor and to provide for any selected constant speed of operation for the machine for another direction of operation of the motor.

A still further object of our invention is to increase the speed of reversal of a reversible motor and to effect such rapid reversal of a motor in a substantially constant time interval and substantially independent of the magnitude of the load variations on the motor.

Another broad object of our invention is to provide a system of control for varying the voltage impressed on the terminals of a direct current motor in such manner that the speed selected for the motor by the control is attained in a relatively short time interval and is substantially independent of the load on the motor; the direction of rotation of the motor; and any of the other factors that would ordinarily prevent operation of the motor at the speed selected for it.

Further, separate and distinct, as well as combined, objects of our invention are: To increase the number of reversals of a motor for a given time interval; increasing the efficiency of all reversals by reducing the time of changing the motor speed from a predetermined speed in one direction to a predetermined speed in another direction; decreasing the consumption of the electric energy by the control; increasing the effective range of the regulation of the control; decrease the current load of a regulator-generator used in the control; and increase the speed of response of the main generator to the controlling effect of the regulator-generator.

It is also a general object of our invention to provide a control system for a tool operating machine that shall be simple, efficient and accurate in operation, and which may be readily and economically manufactured and installed.

Other objects and advantages not specifically hereinbefore recited will become more apparent from a study of the following specification when considered in conjunction with the accompanying drawings, in which.

Figure 1:
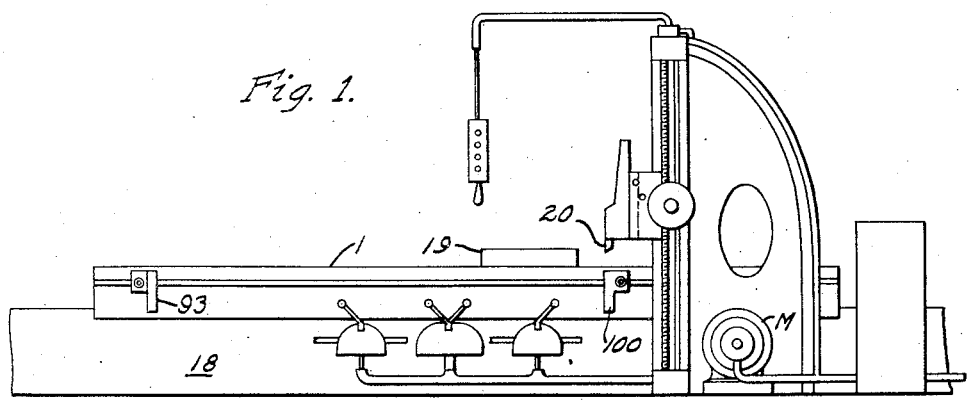
Figure 1 is a side view, somewhat diagrammatic, of a planar having a tool support and a motor for operating the platen.
Figure 2:
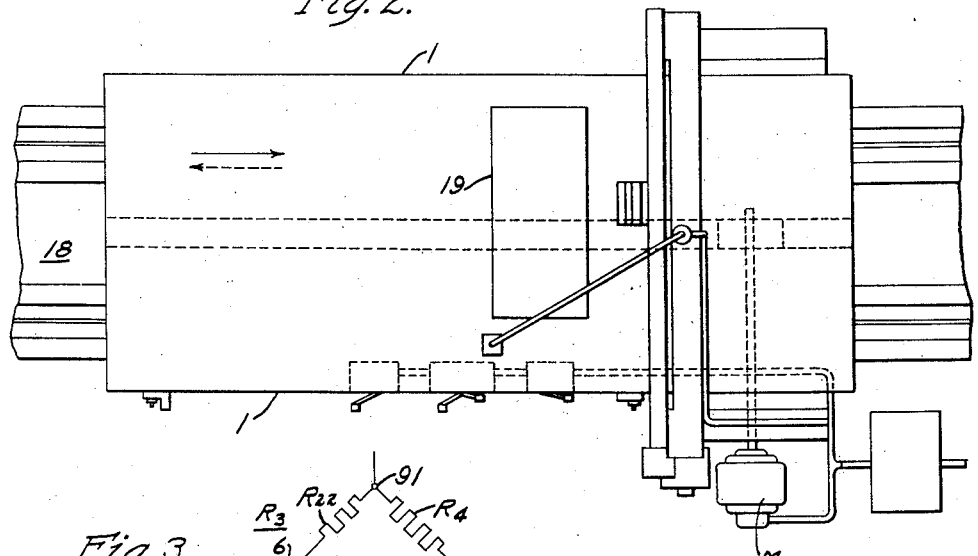
Fig. 2 is a plan view of the subject matter shown in Fig. 1.
Figure 3:
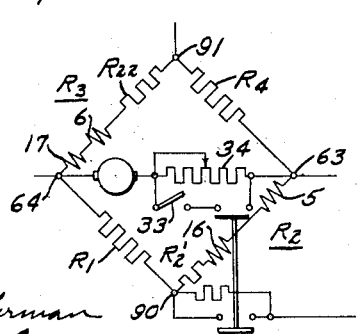
Fig. 3 is a diagrammatic showing of that portion of our system of control embodying most of the novel features of our invention.

In the practice of our invention, we provide a variable-voltage control in which the motor M is mechanically coupled to drive a machine tool as a planer platen 1. The motor M is provided with a separately excited field winding 2 which is arranged to be energized in a single direction only. A generator G is provided having its armature 3 substantially directly connected to the armature 4 of the motor. The control of the speed and acceleration of the motor and in consequence the speed and acceleration of the planer platen and the direction of movement of the planer platen is effected by varying the amount and direction of excitation of the field windings 5 and 6 of the main generator. This control may be effected in a few or in many steps depending upon the type of operation that is desired.

In order to maintain the speed of the motor M at various constant speed values corresponding to a specific adjustment of the controller 8 used for controlling the current flowing through the main field windings of the generator, we use a regulator-generator R. This regulator-generator R is arranged to measure the speed and load of the motor and the current flowing through the main field windings 5 and 6 of the generator. The armature 9 of the regulator-generator is arranged so that it may be connected in series circuit relation with the generator field windings 5 and 6, whereby the voltage generated in the armature in response to the speed and load of the motor and the current flowing through the generator field windings 5 and 6 will cause a current to flow through the main generator field windings 5 and 6, which current will be a function of the departure of the motor speed from a predetermined value corresponding to the particular setting of the controller 8 for the main field windings; that is, will correspond to the particular setting of the adjustable lead 10 of the rheostat 12.

Under certain load and operating conditions, no voltage will be generated in the armature of the regulator generator R, since under these conditions the speed of the motor M corresponds to the setting of the controller 8, that is, corresponds to the adjustment of rheostats 12 and 13. For all other conditions, however, a voltage will be generated in the armature of the regulator-generator in such a direction and of such a value as to cause a current to flow through the main field windings 5 and 6 of the generator G to operate the motor at the desired, or selected speed.

In order to measure the speed of the motor M and load carried by the motor M, the regulator generator R is provided with a series field winding 14 through which all or a portion of the current flowing from the generator G to the motor M flows. The regulator-generator is also provided with a main field winding 15 which is connected to be responsive to the voltage applied to the motor. These two field windings, namely, 14 and 15, are differentially related to each other so that the resulting flux is a function of the speed of the motor M as measured by the counter-electromotive force of the motor. That is, the magnetomotive force produced by the series field winding 14 is proportional to the IR drop of the motor armature 4, and the magnetomotive force produced by the main field winding 15 of the regulator generator is proportional to the voltage impressed across the terminals of the armature of the motor. Thus, the resulting flux due to the differential relationship between the two field windings is a function of the counter-electromotive force of the motor. Since this flux results from the combined action of the current flowing through the motor armature and the voltage applied thereto, it is also a function of the load carried by the motor. The voltage which is generated in the armature of the regulator-generator due to this resulting flux is then a function of the speed of the motor and the load carried thereby.

It is desirable that any change in the voltage of the generator caused by the voltage generated in the regulator generator armature and effecting the current flow through the main field windings 5 and 6 of the generator G be immediately reflected in the voltage generated in the armature 9 of the regulator-generator R. Such action is desired in order to prevent hunting of the system. As soon as a voltage appears in the armature of the regulator-generator indicating that the speed of the motor M has departed from the desired speed, a change in the flow of current through the main field windings 5 and 6 of the generator G takes place in such a direction as to tend to restore the speed of the motor to the desired speed. If some means is not provided for immediately effecting a corresponding change in the corrective voltage generated in the armature 9 of the regulator-generator R, the resulting change in the effects of the series and main field windings 14 and 15 of the regulator-generator in response to the corrective effect will take place too late. As a result, the speed of the motor will be altered more than is desired and hunting will result.

In order to make the correction applied by the regulator-generator proportional to the departure of the speed of the motor from the desired speed corresponding to a particular setting of the controller for the main field windings 5 and 6 of the generator G, a pair of differential field windings 16 and 17 are provided in the regulator generator. These field windings 16 and 17 are connected in series with the main generator field windings 5 and 6, respectively. Thus any change in current which flows through the main generator field windings 5 and 6 is immediately reflected in the voltage which is generated by the armature of the regulator-generator. It is then unnecessary to await the correction in the speed of the motor, as reflected in the change in the effects produced by the series and main field windings of the regulator-generator to correspondingly affect the voltage generated by the armature of the regulator-generator. The differential field windings 16 and 17 of the regulator generator are arranged to produce an effect in the same direction as the effect produced by the series field winding 14 of the regulator-generator and, therefore, they oppose or are differentially related to the effect of the main field winding 15 of the regulator-generator.

There is always, then, a certain relationship between the speed and load of the motor and the corrective effect caused thereby in altering the flow of current through the main field windings of the generator. As a result, the system is free from hunting and the speed of the motor is maintained at predetermined values corresponding to various settings of the lead 10 of the controller 8 regardless of the many variable conditions which would otherwise affect the speed, and cause it to change from the values desired.

As has been stated hereinbefore, it is desirable to effect a corrective action in the current flowing through the main field windings 5 and 6 of the generator G by means of the regulator-generator R, without altering the currents flowing through the main field windings 5 and 6 from the controller. It is then possible to maintain a precise relationship between the speed of the motor and the corresponding movement of the planer platen and the various settings of the controller, regardless of the load or other variable conditions which otherwise would normally affect the operation of the motor.

We have discovered that a Wheatstone bridge arrangement may be combined with the control for machine tools to effect the desired independent control of the current flowing through the main field windings of the generator. We provide a Wheatstone bridge circuit in which the differential field windings 16 and 17 of the regulator-generator and the main generator field windings 5 and 6 are respectively connected in series circuit relation, and form either a part or all of two of the branches of the Wheatstone bridge circuit. The armature of the regulator-generator is connected across one pair of opposite terminals of the Wheatstone bridge circuit while the remaining pair of terminals is connected through some switches and through the controller 8 to an independent source of electrical energy. With such an arrangement, it is possible to vary the current flowing through the branches of the bridge containing the main field windings 5 and 6 of the generator G by means of the controller 8 independently of the current flow therethrough from the armature of the regulator-generator, and vice versa.

Referring more particularly to Fig. 1 of the drawings, M designates generally the motor mechanically coupled to drive the planer platen 1 of the planer 18. A work piece 19 is shown mounted on the platen and as the platen reciprocates by reason of the reversing operation of the motor M the tool 20 mounted on the cross rail, not shown, operates on the work piece 19.

The motor M is substantially directly electrically connected to the generator G. (See Fig. 4). The generator G has main field windings 5 and 6 and a differential stabilizing field winding 21. The armature 3 of the generator G is mechanically coupled to the shaft 22 of the induction motor, or other prime mover P. This induction motor P is disposed to be connected to the buses 23, 24 and 25 leading to a suitable source of alternating current energy.

In order to properly control the motor M, we use a regulator-generator generally designated R, which regulator-generator has the armature 9 mechanically coupled to an induction motor 26. The motor 26 is a relatively small machine but has winding arrangements similar to the winding arrangements of motor P so that the speed of the regulator-generator R and the speed of the generator G are, when in normal operation, the same. If desirable, the regulator-generator may be mechanically coupled to the shaft 22. In actual practice, since the dynamo-electric machines 26 and R are of about the same capacity, they will be built as a unit having the same frame and shaft.

Figure 4:
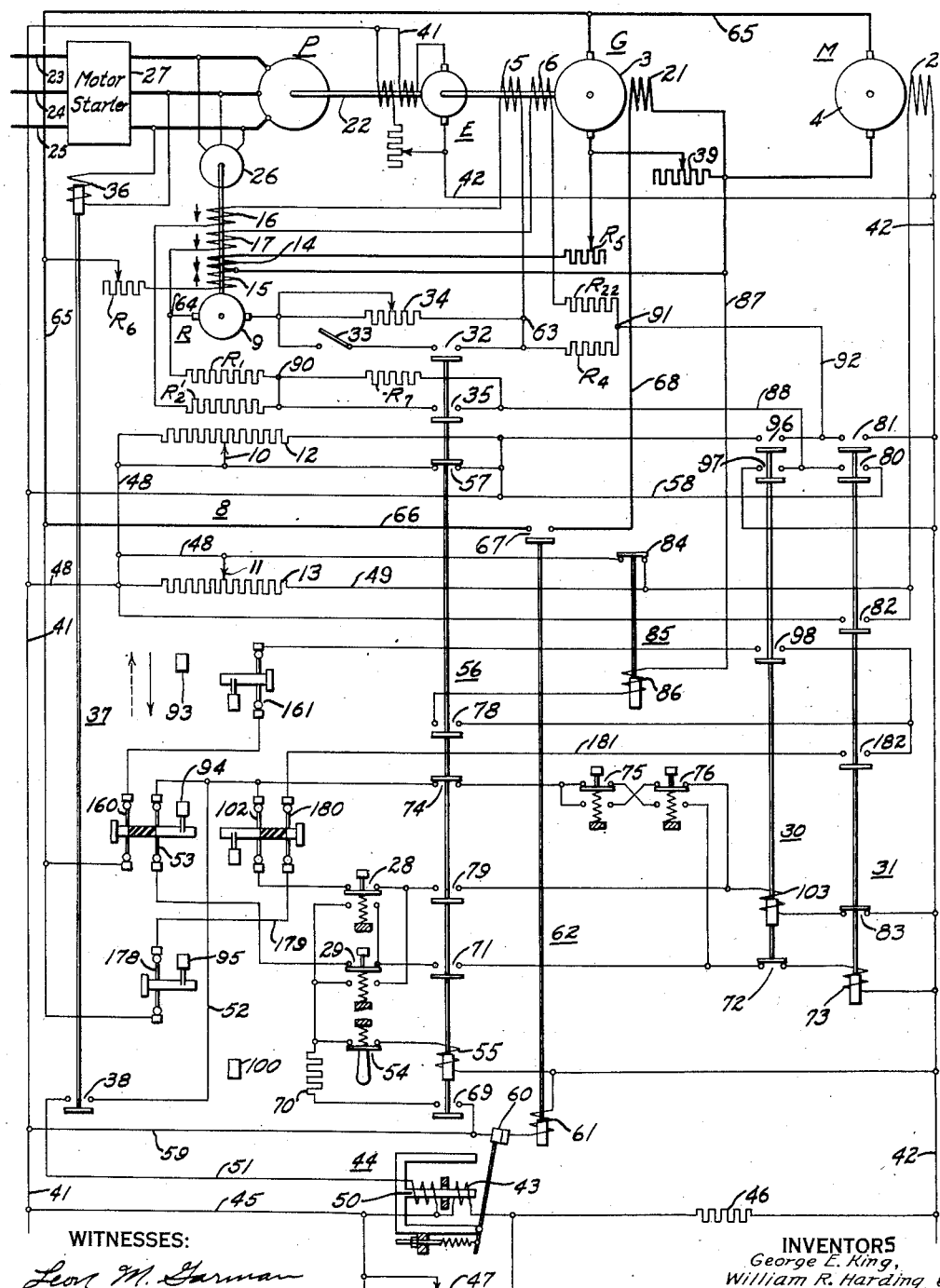
Fig. 4 is a diagrammatic representation of a complete system of control for a reversing motor operating a planar platen or other tool actuating machine embodying the novel features of our invention.

As shown in Fig. 4 the regulator-generator R is provided with a shunt field winding, a pair of differential field windings 16 and 17 and a series field winding 14. As indicated by the arrows adjacent these mentioned field windings, differential field windings 16 and 17 and the series field winding 14 are so wound on the pole pieces of the regulator-generator R that they produce magnetomotive forces in the same direction but opposite to the direction of the magnetomotive force produced by the shunt field winding 15.

Assuming the generator G is in operation through suitable operation of controller 27, the starting of the motor M is controlled by push-button switch 28 and 29 which control reversing or directional contactors 30 and 31. The operation of either of the reversing contactors effects the connection of the controller 8 in the system of control to the exciter E. When the controller 8 is thus connected to the exciter E the current through the Wheatstone bridge will be in one direction when directional contactor 30 is operated and in another direction when the directional contactor 31 is operated.

It is desirable to independently control the flow of current through the main field windings 5 and 6 of the generator G from two sources, one of the sources comprising the exciter E across the armature terminals of which the rheostat 12 and the Wheatstone bridge are connected, and the other source comprising the armature 9 of the regulator-generator. For this purpose we provide, as already suggested, a Wheatstone bridge circuit comprising the customary four legs or branches, two of which include the resistors $R_1$ and $R_4$ and the other two branches comprise, one of them, the resistor $R'_2$, differential field winding 16 of the regulator-generator R and field winding 5 of the main generator G and the other of them, the resistor $R_{22}$ field winding 6 of main generator G, and differential field winding 17 of the regulator-generator R.

The armature 9 of the regulator generator may have its terminals connected to two of the opposite terminals of the Wheatstone bridge either through switches 32 and 33 or through resistor 34. The other two opposite terminals of the Wheatstone bridge may be connected, either through the switch 35 or resistor $R_7$, and rheostat 12 and certain switches of the directional contactors 30 and 31 to the exciter E. The series field winding 14 of the regulator-generator R is connected, as illustrated, in series with an adjustable resistor $R_5$ disposed in the circuit connecting the armatures 3 and 4 of the generator G and motor M, respectively. An adjustable shunt 39 may be provided for adjusting the flow of current through the series field winding 14. The shunt field winding 15 is connected through an adjustable resistor $R_6$ across the armature terminals of the motor M. The resistor $R_6$ is used to reduce the heat loss in the shunt field winding 15 and in consequence reduces to a minimum any change in resistance of the field winding 15 by reason of temperature changes.

To analyze the functioning of the Wheatstone bridge and the regulator-generator, an investigation of the mathematical relations of the circuit characteristics may not be amiss.

Let V = control voltage that may be obtained from controller 8; namely, the voltage across junctions 90 and 91.

Let the four branches of the Wheatstone bridge be indicated by the resistors $R_1$, $R_2$, $R_3$ and $R_4$. The resistance of the resistor $R_2$ is, of course, composed of the combined resistance value of $R'_2$, differential field winding 16, and field winding 5 whereas the resistance of resistor $R_3$ is composed of the resistance value of $R_{22}$, field winding 6 and differential field winding 17.

Let $E_R$ = the voltage obtained from the armature of the regulator-generator.

Let $I_1$, $I_2$, $I_3$ and $I_4$ indicate the currents flowing in the branches of the Wheatstone bridge.

Let $R_5$ also indicate the resistance value of resistor $R_5$ connected in series with the field winding 14.

Let $R_6$ also indicate the resistor value of the adjustable resistor $R_6$ connected in series with the shunt field winding 15.

In order to show that the currents flowing through the generator field windings 5 and 6 in two of the branches of the bridge circuit may be independently changed by altering either the control voltage or the voltage supplied by the regulator-generator R the following derivation of the current flowing through these windings is set forth; and, based on the assumption that the bridge circuit is balanced (1) $\quad V = I_1 R_1 + I_3 R_3,$ and $I_1 = \dfrac{V - I_3 R_3}{R_1}$ (2) $\quad E_R = I_3 R_3 - I_4 R_4,$ and $I_4 = \dfrac{I_3 R_3 - E_R}{R_4}$ and (3) $\quad V = I_2 R_2 - E_R + I_3 R_3,$ and $I_2 = \dfrac{V + E_R - I_3 R_3}{R_2}$ (4) $\quad I_1 + I_2 = I_3 + I_4$ We select the resistance values of the field windings 5 and 6, and 16 and 17, and the resistance value of resistors $R'_2$ and $R_{22}$ and resistors $R_1$ and $R_4$ such that $R_1 = R_2 = R_3 = R_4$. More specifically we select the resistance values such that the resistance values of fields 5 and 6 are equal to each other, the resistance values of field windings 16 and 17 are equal to each other and the resistance values of resistors $R'_2$ and $R_{22}$ are equal to each other. Since the regulator-generator is an independent source of potential in the galvanometer circuit of a Wheatstone bridge it does not follow that $I_3$, for instance, is equal to $I_4$, but it does follow that $I_2 = I_3$.

Simplifying Equation 3 and remembering that $R_1 = R_2 = R_3 = R_4$ and that $I_2 = I_3$ (6) $\quad I_3 = \dfrac{E_R}{2R_3} + \dfrac{V}{2R_3}$ or (7) $\quad I_2 = \dfrac{E_R}{2R_2} + \dfrac{V}{2R_2}$ From Equations 6 or 7 it will be apparent that either the control voltage V, or the regulator voltage $E_R$ may be changed to independently produce changes in the currents $I_3$ and $I_2$ flowing in the field windings 5 and 6 of the generator G.

As has been hereinbefore pointed out, it is desirable to maintain a predetermined relationship between the speed of the motor M and the control voltage V represented by the setting of the lead 10 of the controller regardless of the variable characteristics of the system or the direction of rotation of the motor M. The regulator-generator R serves as an automatic compensator to effect this desired relationship. When the regulator-generator is used there is a constant relation between the speed of the motor M and the control voltage V which relation, due to the regulator-generator R, is unaffected by the variable characteristics of the system. That this relationship is true will be apparent from the following:

The voltages generated by the regulator-generator when the field windings are individually excited, may be represented by the following equations:

(8) Voltage resulting from winding 14, $E_{14} = k_{14}I_{14}$;

(9) Voltage resulting from winding 15, $E_{15} = k_{15}I_{15}$;

(10) Voltage resulting from windings 16, $E_{16} = k_{16}I_{16}$;

(11) Voltage resulting from winding 17, $E_{17} = k_{17}I_{17}$, where $I_{14}$, $I_{15}$, $I_{16}$, and $I_{17}$ represent the currents in the windings 14, 15, 16 and 17, and where $k_{14}$, $k_{15}$, $k_{16}$, and $k_{17}$ are constants obtained from the magnetization curves of the regulator-generator R, when it is individually excited by the respective field windings.

The voltage $E_R$ generated by the armature of the regulator-generator equals the sum of the individual voltages generated by the four field windings when they are simultaneously energized. Since the effect of winding 15 is opposite to the effect of windings 14, 16 and 17,

(12) $\quad E_R = k_{14}I_{14} + k_{16}I_{16} + K_{17}I_{17} - K_{15}I_{15}$, or since $I_{16} = I_{17} = I_3 = I_2$ Equation 12 becomes

(13) $\quad E_R = k_{14}I_{14} + (k_{16} + k_{17})I_{16} - k_{15}I_{15}$ and Equation 6 may be rewritten as

(14) $\quad E_R = I_{16} 2R_2 - V$

To accomplish all the desired results, in addition to the relations of the electrical constants already pointed out, it is necessary to make the quantity $2R_3$ equal to the sum of the constant $k_{16} + k_{17}$. Employing this relationship and combining (13) and (14) the following equation is obtained:

(15) $\quad k_{15}I_{15} = V + k_{14}I_{14}$

The current flowing through the main or shunt field winding 15 of the regulator-generator may be expressed by the following equation:

(16) $\quad I_{15} = \dfrac{E_3 - I_{14}R_5}{R_6 + R_{15}}$

Combining (15) and (16) we get

(17) $\quad k_{15}\dfrac{(E_3 - I_{14}R_5)}{R_6 + R_{15}} = V + k_{14}I_{14}$ and solving for $E_3$ we get

(18) $\quad E_3 = \dfrac{R_6 + R_{15}}{k_{15}}[V + k_{14}I_{14}] + I_{14}R_5$

Since the resistance $R_{14}$ of the regulator series field winding is negligible and the current flowing through the main field winding 15 is also negligible as compared to the current flowing to the motor M, both of these values may be neglected and the counter-electromotive force of motor M or its speed may be represented

(19) $\quad E_M = E_3 - I_{14}(R_5 + R_M)$

Combining (19) and (18)

(20) $\quad E_M = \dfrac{R_6 + R_{15}}{k_{15}}[V + k_{14}I_{14}] + I_{14}R_5 - I_{14}R_5 - I_{14}R_M$

(21) $\quad E_M = \dfrac{R_6 + R_{15}}{k_{15}}[V + k_{14}I_{14}] - I_{14}R_M$

By proper selection of the value of $R_M$, and if necessary, the values $k_{15}$, $k_{14}$, $R_6$ and $R_{15}$, $R_M$ may be made equal to $$\dfrac{k_{14}}{k_{15}}(R_6 + R_{15})$$

This means that

(22) $\quad E_M = \left(\dfrac{R_6 + R_{15}}{k_{14}}\right)V = KV$

Equation 22 thus shows that the speed of the motor M, as represented by its counter-electromotive force $E_M$, and thus the speed of the planer platen will always be equal to a constant, as K, times the control voltage V, i. e., $E_M$ will always be directly proportional to control voltage V, namely, directly proportional to the change in position of the lead 10, regardless of the variable characteristics of the system of control.

A still better understanding of our system of control may be had from a more detailed study of its operation.

If the attendant wishes to start the equipment he actuates the motor starter 27 to thus cause the operation of prime mover P and the induction motor 26. Regulator-generator R, the exciter E and the main generator G are thus caused to operate. Operation of the motor starter also establishes an energizing circuit for the coil 36 of the contactor 37 whereupon the contact members 38 are closed to set up circuit connections to be described later.

When the motors P and 26 are up to full speed, the voltage of exciter E will be of full value and in consequence the main motor M may be started. Since the exciter voltage is up to normal, a predetermined direct-current potential is placed across buses 41 and 42.

Energization of buses 41 and 42 provides an energizing circuit for the neutralizing coil 43 of the time limit relay 44. The current through coil 43 may be adjusted by proper selection of the resistance value of resistor 46 and the adjustment of resistor 47.

The field winding 2 of motor M is also energized from buses 41 and 42. The field circuit may be traced from bus 41 through conductor 48, the field rheostat comprising the resistor 13 and adjustable lead 11, conductor 49, field winding 2 to bus 42. An additional but low resistance circuit is also established for the field winding 2, which additional circuit may be traced from energized conductor 48 through contact members 84 of starting control relay 85, shunting the field rheostat.

A still further circuit is established from bus 41 through conductor 59, contact members 60 of the time limit relay 44 and actuating coil 61 of control relay 62 for the stabilizing field winding 21.

Operation of control relay 62 establishes a circuit from the upper terminal of the armature 3 of the main generator G through conductors 65 and 66, contact members 67 of relay 62, conductor 68, stabilizing field winding 21 and adjustable resistor 39 to the lower terminal of armature 3. The connection of field 21 is such as to buck the residual magnetism of the generator. The field 21 operates to stabilize the generator and assure that the generator does not generate a voltage. Since the generator is not generating any voltage motor M will not operate.

To effect normal operation of motor M, either one of the switches 28 and 29 should be operated. Let switch 28 be the forward control push button switch. To effect forward operation, that is, an operation in the out direction, the attendant depresses the switch 28. A circuit is immediately established from bus 41 through conductor 45, the magnetizing coil 50 of the time limit relay 44, conductor 51, contact members 38, conductor 52, reversing limit switch 53, reverse starting push button switch 29, the lower terminals of switch 28, stop switch 54, actuating coil 55 of regulator-generator control relay 56 to the bus 42.

Time limit relay 44 has a very negligible time constant when coil 50 is energized, as just explained, with the result that contact members 60 open immediately, whereupon coil 61 is deenergized and contact members 67 open the circuit for the stabilizing field winding 21.

Operation of relay 56 establishes its own holding circuit through contact members 69 and resistor 70, and also closes switches or contact members 32, 35, 78, 79 and 71.

Closure of contact members 71 establishes a circuit from energized conductor 52 through limit switch 53, switch 29, contact members 71, back contact members 72 of directional contactor 30 and actuating coil 73 of directional contactor 31 to bus 42.

Closure of contact members 32 connects the armature of the regulator generator R directly in the galvanometer circuit of the Wheatstone bridge. This circuit may be traced from junction 63 through contact members 32, knife switch 33 which is, except for rapid short stroke operation, normally closed, and armature 9 to junction 64. By opening the switch 33 the adjustable resistor 34 is inserted in the circuit of armature 9 and by increasing the resistance of resistor 34 more and more the speed of reversal of motor M can be increased more and more. Since the requirements are more often for long strokes, the reversal is ordinarily rapid enough if switch 33 is closed.

Closure of switch or contact members 35 shunts the resistor so that the full voltage of the exciter E is applied, as modified by controller 8, to the junctions 90 and 91 of the Wheatstone bridge circuit. Closure of contact members 78 and 70 does not immediately close any circuits.

The relay 56 also opens contact members 57 and 74. Opening of contact members 57 inserts the controller 8 in the control circuit for the generator and the opening of contact members 74 eliminates the inching push button switches 75 and 76 so that they cannot be used to interfere with the automatic control.

Closure of contact members 71 causes the operation of forward directional contactor 31 which contactor causes the opening of contact members 83, so that the closure of contact members 79 will have no effect, and causes the closure of contact members 80, 81, 82 and 182.

Closure of contact members 82 shunts the rheostatic control for the field winding 2 during the cutting stroke. High operating torque and a low speed is thus assured during the cutting operation.

Operation of directional contact 31 also establishes a circuit from bus 41 through conductor 48, the lead 10 of controller 8, a portion of resistor 12, conductor 58, contact members 80, conductor 88, contact members 35 to junction 90, through the Wheatstone bridge to junction 91, conductor 92, contact members 81 to bus 42.

The regulator-generator R connected in the Wheatstone bridge having the relative circuit constants hereinbefore specified and excited in the manner hereinbefore stated will thus produce a control effect so as to give the planer platen a speed in the cut direction which is a direct measure of the position of lead 10 on the resistor 12. Neither the cutting load, the ambient temperature, the temperature of the electric units, direction of operation, nor any other of the many factors, that might otherwise affect the speed of operation of the motor M, will have any material effect. The speed of the motor will thus always be determined by the position of the controller lever, namely, the position of leads 10 and 11.

Further the novel arrangement of the windings 5, 6, 16 and 17 in the Wheatstone bridge and the proper selection of the electrical constants of these windings and all the resistors associated with them has increased the efficiency of all reciprocating strokes by reducing the time of changing from a predetermined speed in one direction to a predetermined speed in another direction. The number of reversals per minute that were possible with old schemes was about 20 per minute but with our system of control this has been increased to a maximum of 52 per minute.

The novel circuit arrangement makes the regulator-generator more effective with less current consumption than was formerly the case, and its effective range controlling speed has been increased.

As the planer platen moves to the end of its stroke, a dog, schematically indicated by block 93 mounted on the platen first actuates the lever 94 and after travelling but a short distance farther actuates lever 95. Coils 50 and 73 are thus deenergized. Contact members 80, 81, 82 and 182 thus open and contact members 83 close.

Opening of contact members 182 interrupts the circuit for coil 86 of the accelerating control relay 85. The circuit for coil 86 just prior to the arrival of the platen at the end of the stroke was from conductor 65 through limit switch 178, conductor 179, limit switch 180, conductor 181, contact members 182 and 78, coil 86, conductor 87, resistor 39, armature 3 back to conductor 65. By opening contact members 182 we make the operation of relay 85 at critical times, as at reversal, independent of the voltage of generator G. Contact members 84 are thus held closed at reversal even though the generator voltage may not drop with the desired speed. The field winding 2 of motor M thus is heavily energized and the stopping of the platen and the re-acceleration in the reverse direction is speeded up.

The more rapid re-acceleration, but in the return direction, is accomplished as explained hereinafter.

The instant contact members 83 close, a circuit is established from bus 41 through coil 50 of time limit relay 44, conductor 51, contact members 38, conductor 52, limit switch 102, switch 28, contact members 79, actuating coil 103 of reverse directional contact 30, and contact members 83 to bus 42. During normal reciprocating movements of the platen contact members 60 will at no time close. This is as it should be because field 21 needs to be energized only when initially starting the equipment.

Operation of contactor 30 causes the opening of contact members 72 to prevent reenergization of coil 73 and also causes the closing of contact members 96, 97 and 98. The motor M is thus caused to reverse yet during its very initial stages of reverse operation the motor field 2 is heavily energized to provide a heavy starting torque. This is so because contact members 84 at this stage are still closed regardless of the closure of contact members 98.

As the platen moves in the return direction it first resets limit switch 178 and after a very short distance of travel resets limit switches 53 and 160 whereupon a circuit is established from conductor 65 through limit switches 160 and 161, contact members 98 and 78, coil 86 to energized conductor 87. Contact members 84 are thus opened, the field excitation of field 2 is decreased and the motor operates to return the platen at a rapid rate.

At the end of the return stroke, dog 100 successively operates limit switches 102 and 180, and 161. The field winding 2 is thus heavily energized since contact members 84 close and since coil 73 is energized, the circuits for the forward operation are reestablished and the platen moves in the cut direction as hereinbefore explained.

We are, of course, aware that others, particularly after having had the benefit of our disclosure, may devise circuit diagrams for accomplishing the same or similar results.

We claim as our invention:

1. In a variable voltage control system, in combination, a motor, a generator electrically connected to the motor, a pair of main field windings for said generator, a pair of resistors one in series circuit respectively with each main field winding to thus make the circuit of each main field winding of relatively high resistance value, a controller for connecting the main field windings and the resistors in series therewith to a control source of energy in a plurality of different steps to effect changes in the speed of the motor, and a regulator-generator connected to vary the flow of current through the main field windings and the resistors in series therewith, independently of the current flow therethrough from said control source of energy, to maintain the speed of said motor at a predetermined or selected different speeds, each speed corresponding to the step selected by said controller, said regulator-generator having an armature winding, a series field winding, a shunt field winding a pair of differential field windings, said series and shunt field windings being disposed to be differentially related to each other and respectively responsive to the current and voltage supplied to said motor from said generator, said armature winding of said regulator-generator, including in its armature circuit a resistor adapted to be connected in series circuit with said armature winding, means for shunting said resistor, and means for also adjusting the resistance value of said resistor, being connected across one pair of opposite terminals of a normally balanced Wheatstone bridge circuit, the remaining pair of terminals of said bridge circuit being connected through said controller to said control source of energy, one of the arms of said bridge circuit including one of the pair of resistors and one of the pair of said main field windings and, in series circuit therewith, one of the said pair of differential field windings of said regulator-generator and the diametrically opposite arm of said bridge circuit including the other one of said pair of resistors and the other one of the said pair of main field windings and, in series circuit therewith, the other of said pair of differential field windings of said regulator-generator.

2. In a variable voltage control system, in combination, a motor, a generator electrically connected to the motor, a pair of relatively high impedance main field windings for said generator, a controller for connecting the main field windings to a control source of energy in a plurality of different steps to effect changes in the speed of the motor, and a regulator-generator connected to vary the flow of current through the high impedance main field winding independently of the current flow therethrough from said control source of energy, to maintain the speed of said motor at predetermined or selected different speeds, each speed corresponding to the step selected by said controller, said regulator-generator having an armature winding, a series field winding, a shunt field winding, a pair of differential field windings, said series and shunt field windings being disposed to be differentially related to each other and respectively responsive to the current and voltage supplied to said motor from said generator, said armature winding of said regulator-generator, including in its armature circuit a resistor adapted to be connected in series circuit with said armature winding, and means for adjusting the resistance value of said resistor, being connected across one pair of opposite terminals of a normally balanced Wheatstone bridge circuit, the remaining pair of terminals of said bridge circuit being connected through said controller to said control source of energy, one of the arms of said bridge circuit including one of the pair of said main high impedance field windings and, in series circuit therewith, one of the said pair of differential field windings of said regulator-generator and the diametrically opposite arm of said bridge circuit including the other of the said pair of high impedance main field windings and, in series circuit therewith, the other of said pair of differential field windings of said regulator-generator.

3. In a variable voltage control system, in combination, a motor, a generator electrically connected to the motor, a pair of main field windings for said generator, a pair of resistors one in series circuit respectively with each main field winding, a controller for connecting the main field windings to a control source of energy in a plurality of different steps to effect changes in the speed of the motor, and a regulator-generator connected to vary the flow of current through the main field windings and the respective resistors in series therewith, independently of the current flow therethrough from said control source of energy, to maintain the speed of said motor at predetermined or selected different speeds, each speed corresponding to the step selected by said controller, said regulator-generator having an armature winding, a series field winding, a shunt field winding, a pair of differential field windings, said series and shunt field windings being disposed to be differentially related to each other and respectively responsive to the current and voltage supplied to said motor from said generator, said armature winding of said regulator-generator, including in its armature circuit a resistor adapted to be connected in series circuit with said armature winding, being connected across one pair of opposite terminals of a normally balanced Wheatstone bridge circuit, the remaining pair of terminals of said bridge circuit being connected through said controller to said control source of energy, one of the arms of said bridge circuit including one of the pair of said main field windings and the resistor in series therewith and, in further series circuit therewith one of the said pair of differential field windings of said regulator-generator, and the diametrically opposite arm of said bridge circuit including the other of the said pair of main field windings and the resistor in series therewith and further, in series circuit therewith, the other of said pair of differential field windings of said regulator-generator.

4. In a variable voltage control system, in combination, a motor, a generator electrically connected to the motor, a pair of main field windings for said generator, a resistor in series with each main field winding, a controller for connecting the main field windings to a control source of energy in a plurality of different steps to effect changes in the speed of the motor, and a regulator-generator connected to vary the flow of current through the main field windings and resistor in series therewith, independently of the current flow therethrough from said control source of energy, to maintain the speed of said motor at predetermined, or selected, different speeds, each speed corresponding to the step selected by said controller, said regulator-generator having an armature winding, a series field winding, a shunt field winding, a pair of differential field windings, said series and shunt field windings being disposed to be differentially related to each other and respectively responsive to the current and voltage supplied to said motor from said generator, said armature winding of said regulator-generator, being connected across one pair of opposite terminals of a normally balanced Wheatstone bridge circuit, the remaining pair of terminals of said bridge circuit being connected through said controller to said control source of energy, one of the arms of said bridge circuit including one of the pair of said main field windings and the resistor in series therewith and further, in series circuit therewith, one of the said pair of differential field windings of said regulator-generator, and the diametrically opposite arm of said bridge circuit including the other of the said pair of main field windings and the resistor in series therewith and further, in series circuit therewith, the other of said pair of differential field windings of said regulator-generator.

5. In a variable voltage control system, in combination, a motor, a generator electrically connected to the motor, a pair of main field windings for said generator, a resistor in direct series circuit relation with each main field winding, a controller for connecting the main field windings to a control source of energy in a plurality of different steps to effect changes in the speed of the motor, and a regulator-generator connected to vary the flow of current through the main field windings, independently of the current flow therethrough from said control source of energy, to maintain the speed of said motor at predetermined, or selected, different speeds, each speed corresponding to the step selected by said controller, said regulator-generator having an armature circuit including an armature winding and adjustable resistor, a series field winding, a shunt field winding, a pair of differential field windings, said series and shunt field windings being disposed to be differentially related to each other and respectively responsive to the current and voltage supplied to said motor from said generator, means for varying the resistance of said armature circuit from a given minimum to a given maximum, said armature circuit being connected across one pair of opposite terminals of a normally balanced Wheatstone bridge circuit, the remaining pair of terminals of said bridge circuit being connected through said controller to said control source of energy, one of the arms of said bridge circuit including one of the pair of said main field windings and the resistor in series therewith and further, in series circuit therewith, one of the said pair of differential field windings of said regulator-generator and the diametrically opposite arm of said bridge circuit including the other of the said pair of main field windings and the resistor in series therewith and further, in series circuit therewith, the other of said pair of differential field windings of said regulator-generator.

6. In a system of control for a motor, in combination, a Wheatstone bridge, a pair of resistors in each of two of the branches, a second pair of resistors, a pair of generators, one of said generators having four field windings and the other of said generators having at least two field windings, one of the field windings of the first generator and one of the field windings of the second generator and one of the second pair of resistors, connected in series circuit relation, being connected in one of the branches of the bridge and a second field winding of the first generator and the remaining, or second, field winding of the second generator and the other of the second pair of resistors, connected in series, being connected in the remaining branch of said Wheatstone bridge, said remaining two field windings of the first generator being connected respectively across the armature terminals of the second generator and in the armature circuit of the second generator to thus be responsive to the voltage and armature current respectively of the second generator and a motor connected across the armature terminals of the second generator, said first generator being connected across two of the junctions of the said Wheatstone bridge.

7. In a system of control, in combination, a Wheatstone bridge, a pair of resistors in each of two of the branches, a second pair of resistors, and a pair of generators, one of said generators having four field windings and the other of said generators having at least two field windings, one of the field windings of the first generator and one of the field windings of the second generator and one resistor of the second pair of resistors, connected in series circuit relation, being connected in one of the branches of the bridge and a second field winding of the first generator and the remaining, or second, field winding of the second generator and the other resistor of the second pair of resistors, connected in series, being connected in the remaining branch of said Wheatstone bridge, said remaining two field windings of the first generator being connected respectively across the armature terminals of the second generator and in the armature circuit of the second generator to thus be responsive to the voltage and armature current respectively of the second generator, a source of direct-current energy connected across two of the junctions of said Wheatstone bridge, and a motor connected directly to said second generator, said first generator being connected to the remaining junctions of said Wheatstone bridge.

GEORGE E. KING.
WILLIAM R. HARDING.
WILLIAM F. EAMES.